(12) United States Patent
Kikuchi et al.

(10) Patent No.: US 7,759,626 B2
(45) Date of Patent: Jul. 20, 2010

(54) SENSOR DEVICE FOR GENERATING AMBIENT LIGHT INFORMATION

(75) Inventors: Keisaku Kikuchi, Kyoto (JP); Kazunori Osako, Kusatsu (JP); Takahara Takayoshi, Kameoka (JP)

(73) Assignee: Omron Corporation, Kyoto (JP)

( * ) Notice: Subject to any disclaimer, the term of this patent is extended or adjusted under 35 U.S.C. 154(b) by 3 days.

(21) Appl. No.: 11/604,887

(22) Filed: Nov. 28, 2006

(65) Prior Publication Data
US 2007/0125938 A1 Jun. 7, 2007

(30) Foreign Application Priority Data
Nov. 30, 2005 (JP) .............................. 2005-345500

(51) Int. Cl.
G01J 1/44 (2006.01)
G01N 21/86 (2006.01)
G06M 7/00 (2006.01)

(52) U.S. Cl. ........................ 250/214 AL; 250/559.12; 250/221

(58) Field of Classification Search ........... 250/214 AL, 250/214 B, 221, 559.12, 559.15, 559.19, 250/559.21, 559.27; 340/507, 512; 361/173–177; 345/173, 175, 179, 180
See application file for complete search history.

(56) References Cited

U.S. PATENT DOCUMENTS

| 4,943,806 | A | * | 7/1990 | Masters et al. ................. 341/31 |
| 5,130,532 | A | * | 7/1992 | Clemens ...................... 250/221 |
| 5,914,709 | A | * | 6/1999 | Graham et al. ............... 345/179 |
| 2004/0201579 | A1 | * | 10/2004 | Graham ....................... 345/175 |

FOREIGN PATENT DOCUMENTS

JP 11-260215 9/1999

* cited by examiner

*Primary Examiner*—Georgia Y Epps
*Assistant Examiner*—Pascal M Bui-Pho
(74) *Attorney, Agent, or Firm*—Foley & Lardner, LLP

(57) ABSTRACT

A process circuit sets a plurality of light emitting elements in a state in which light is not emitted through a process circuit, and receives a signal S1 corresponding to received ambient light from each of a plurality of light receiving elements. The process circuit generates light receiving information (data DT) showing the light receiving state of the ambient light with respect to each predetermined number of light receiving elements among the plurality of light receiving elements. The process circuit transmits the data DT to the outside. The personal computer receives the data DT through a communication unit and displays it. In a sensor SNS, the amount of light received can be displayed with respect to each optical axis by the personal computer. Thus, an operator can find the light receiving state of the ambient light in more detail than the conventional sensor.

18 Claims, 12 Drawing Sheets

Fig. 15

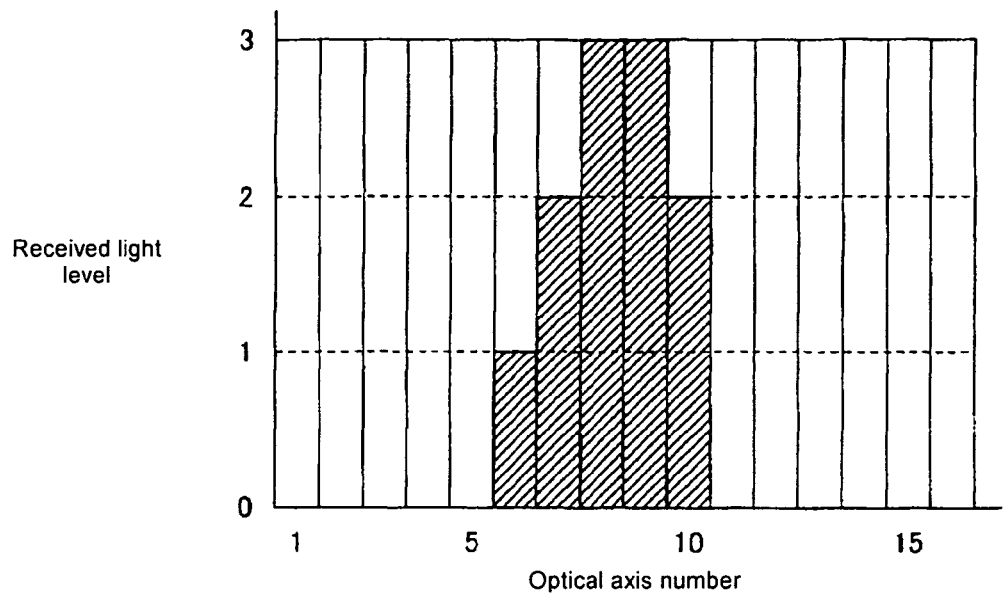

Fig. 16

| Received light number | Sensor length | Received light level | Received light level graph |
|---|---|---|---|
| 25 Optical axis | 226 | 0 | |
| 24 Optical axis | 217 | 8 | |
| 23 Optical axis | 208 | 0 | |
| 22 Optical axis | 199 | 0 | |
| 21 Optical axis | 190 | 0 | |
| 20 Optical axis | 181 | 0 | |
| 19 Optical axis | 172 | 0 | |
| 18 Optical axis | 163 | 0 | |
| 17 Optical axis | 154 | 0 | |
| 16 Optical axis | 145 | 0 | |
| 15 Optical axis | 136 | 0 | |
| 14 Optical axis | 127 | 4 | |
| 13 Optical axis | 118 | 0 | |
| 12 Optical axis | 109 | 0 | |
| 11 Optical axis | 100 | 0 | |
| 10 Optical axis | 91 | 0 | |
| 9 Optical axis | 82 | 4 | |
| 8 Optical axis | 73 | 148 | |
| 7 Optical axis | 64 | 760 | |
| 6 Optical axis | 55 | 0 | |
| 5 Optical axis | 46 | 0 | |
| 4 Optical axis | 37 | 0 | |
| 3 Optical axis | 28 | 0 | |
| 2 Optical axis | 19 | 0 | |
| 1 Optical axis | 10 | 0 | |

SENSOR DEVICE FOR GENERATING AMBIENT LIGHT INFORMATION

This application claims priority from Japanese patent application 2005-345500, filed on Nov. 30, 2005. The entire content of the aforementioned application is incorporated herein by reference.

BACKGROUND OF THE INVENTION

1. Field of the Invention

The present invention relates to a sensor device and more particularly to a multi-optical axis photoelectric sensor.

2. Description of the Background Art

A general multi-optical axis photoelectric sensor comprises a light emitting part in which a plurality of light emitting elements are arranged in a row, and a light receiving part in which the light receiving elements as many as the light emitting elements are arranged in a row. The light emitting elements and the light receiving elements are arranged so as to be opposed to each other. The light emitting part and the light receiving part are connected through a communication line in general. On the side of the light emitting part, each light emitting element sequentially emits light, and on the side of the light receiving part, each light receiving element corresponding to each light emitting element receives the light and outputs the amount of received light at the timing synchronizing with the light emitting operation of the light emitting element. Thus, the light shielding state with respect to each optical axis of the multi-optical axis photoelectric sensor is sequentially detected. In the light receiving part, it is determined whether an object exists in a detection area with the detected result with respect to each optical axis or not and a signal showing the determined result is outputted.

Depending on the setting state of the multi-optical axis photoelectric sensor, even when the light emitting part is set in a state in which the light is not emitted, the light receiving part receives ambient light in some cases. The ambient light causes the malfunction of the sensor. For example, the multi-optical axis photoelectric sensors are closely set in a manufacturing field in many cases. Light from one sensor becomes the ambient light for another sensor.

Thus, measures against the ambient light is most important in setting or adjusting the multi-optical axis photoelectric sensor. In this respect, the user has to grasp the incident ambient light. For example, a photoelectric sensor disclosed in Japanese Unexamined Patent Publication No. 11-260215 (patent document 1) comprises a display device displaying the detection of the ambient light. Thus, the operator who sets the photoelectric sensor can easily find that the ambient light is inputted to the photoelectric sensor.

However, according to the photoelectric sensor disclosed in the Japanese Unexamined Patent Publication No. 11-260215 (patent document 1), the operator cannot find which optical axis has the incident ambient light among the plurality of optical axes. Therefore, in a case where there are many optical axes because a sensor head is long, or in a case where there are many sensors, it takes much time for the operator to specify the generation source of the ambient light.

SUMMARY OF THE INVENTION

It is an object of the present invention to provide a multi-optical axis photoelectric sensor comprising a plurality of light receiving elements in which the light receiving state of ambient light can be found in detail more than the conventional sensor.

A sensor device according to the present invention comprises a light emitting part, a light receiving part, a process part, and an output part. The light emitting part has a plurality of light emitting elements. The light receiving part has a plurality of light receiving elements provided so as to correspond to the plurality of light emitting elements, respectively. The process part sets the plurality of light emitting elements to a state in which the light is not emitted, receives a first signal corresponding to received ambient light from each of the plurality of light receiving elements, and generates light receiving information showing the light receiving state of the ambient light with respect to each predetermined number of light receiving elements among the plurality of light receiving elements based on the first signal. The output part outputs the light receiving information to the outside.

Preferably, the output part is a transmission part for transmitting the light receiving information to the outside.

Preferably, the sensor device further comprises a display device for displaying the light receiving information from the transmission part.

Preferably, the output part is a display device provided at least one of the light receiving part or the light emitting part, for displaying the light receiving information.

Preferably, the above either display device displays the received amount of the ambient light as the light receiving information.

More preferably, the above either display device displays a past maximum value of the received amount of the ambient light as the light receiving information. When the amount of the ambient light exceeds the past maximum value, the display device updates the past maximum value to the present received amount of the ambient light and displays it.

More preferably, the sensor further comprises a storing part storing a determination value for determining the light receiving level of the ambient light, in which the above either display device further displays the determination value as the light receiving information.

Preferably, the above either display device displays the difference between the received amount of the ambient light and the determination value for determining the light receiving level of the ambient light as the light receiving information.

Preferably, the above either display device displays the ratio between the received amount of the ambient light and the determination value for determining the light receiving level of the ambient light as the light receiving information.

Preferably, the process part further sets the plurality of light emitting elements to a state in which the light is emitted, receives a second signal corresponding to received signal light from each of the plurality of light receiving elements, and generates the light receiving information based on the first and second signals.

More preferably, the above either display device displays the received amount of the ambient light and the received amount of the signal light as the light receiving information.

More preferably, the above either display device displays the difference between the received amount of the ambient light and the received amount of the signal light as the light receiving information.

More preferably, the above either display device displays the ratio between the received amount of the ambient light and the received amount of the signal light as the light receiving information.

Preferably, the above either display device displays that the received amount of the ambient light reaches one of stages as the light receiving information.

More preferably, the predetermined number is one.

Preferably, the above either display device displays the light receiving information so as to relate a distance from one end of the light receiving part to each of the plurality of light receiving elements, to the light receiving information.

More preferably, the predetermined number is two or more.

More preferably, the display device is a light emitting device emitting light and displaying the position of the light receiving element whose received amount of the ambient light exceeds a predetermined value among the plurality of light receiving elements as the light receiving information.

According to the present invention, in the multi-optical axis photoelectric sensor comprising the plurality of light receiving elements, the light receiving state of ambient light can be known in more detail than the conventional sensor.

BRIEF DESCRIPTION OF THE DRAWINGS

FIG. 15 is a view showing still another example of the screen display;

FIG. 16 is a view showing still another example of the screen display;

DETAILED DESCRIPTION OF THE PREFERRED EMBODIMENTS

Figure 1:
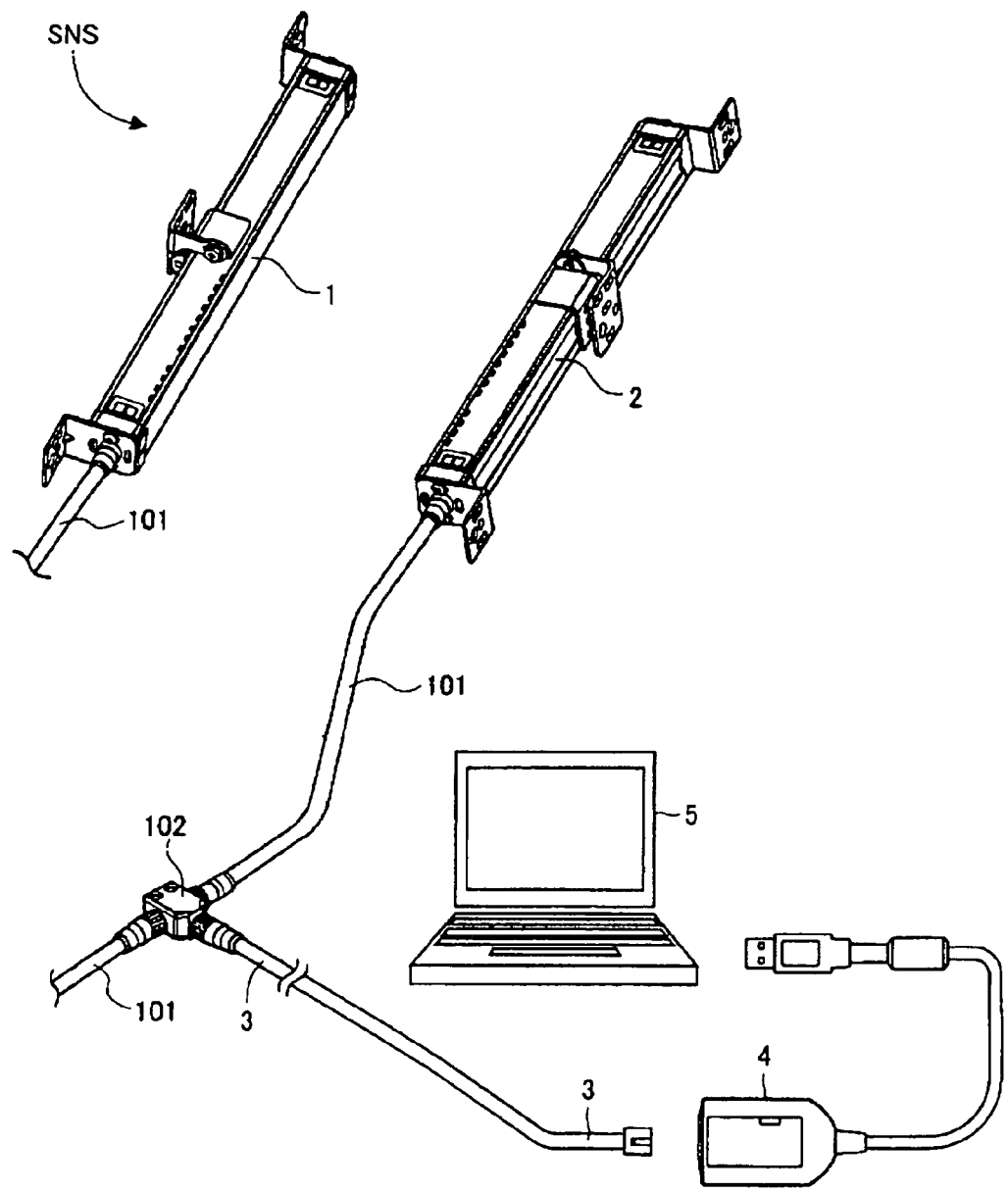
FIG. 1 is an external view showing the constitution example of a sensor device according to an embodiment 1.

Embodiments of the present invention will be described in detail with reference to the drawings hereinafter. In addition, the same signs designate the same or corresponding components in the drawings.

Embodiment 1

FIG. 1 is an external view showing the constitution example of a sensor device according to an embodiment 1.

Referring to FIG. 1, a sensor SNS comprises a light emitting sensor head 1, a light receiving sensor head 2, a communication unit 4 and a personal computer 5.

The sensor SNS is a multi-optical axis photoelectric sensor used in a safety light curtain, for example. According to the sensor SNS, the light emitting sensor head and the light receiving sensor head 2 are connected through a communication cable 101. The communication unit 4 is connected to the communication cable 101 through a branch connector 102 and a dedicated cord 3. The communication unit 4 is connected to the personal computer 5.

Figure 2:
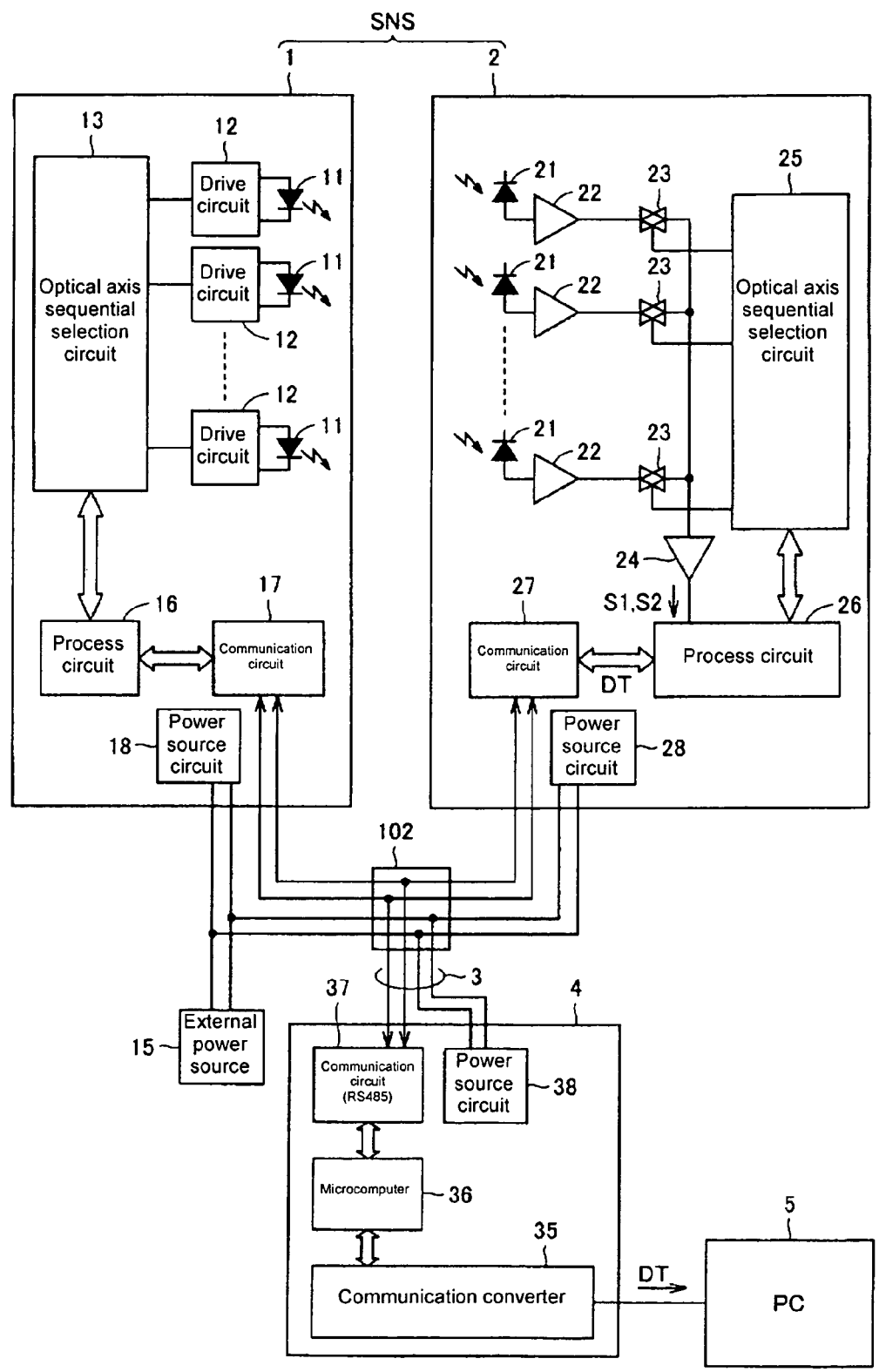
FIG. 2 is a block diagram showing the constitution of a sensor SNS shown in FIG. 1.

FIG. 2 is a block diagram showing the constitution of the sensor SNS shown in FIG. 1 Referring to FIG. 2, the light emitting sensor head 1 comprises a plurality of light emitting elements 11. The light emitting sensor head further comprises drive circuits 12 driving the light emitting elements 11 respectively, an optical axis sequential selection circuit 13, a process circuit 16, a communication circuit 17 and a power source circuit 18.

The light receiving sensor head 2 comprises a plurality of light receiving elements 21 provided so as to correspond to the plurality of light emitting elements 11 respectively. The light receiving sensor head 2 further comprises amplifiers 22, switches 23 provided so as to correspond to the light receiving elements 21 respectively, an optical axis sequential selection circuit 25, a process circuit 26, an input amplifier 24 to the process circuit 26, a communication circuit 27 and a power source circuit 28.

The process circuits 16 and 26 comprise a microcomputer provided with a CPU and a memory. The communication circuits 17 and 27 are communication interfaces in conformity with RS485, and control a signal between the light emitting sensor head 1 and the light receiving sensor head 2.

The optical axis sequential selection circuit 13 sequentially connects the drive circuit 12 of each light emitting element 11 to the process circuit 16. The optical axis sequential selection circuit 25 sequentially connects the amplifier 22 and the switch 23 corresponding to each light receiving element 21 to the process circuit 26.

The power source circuits 18 and 28 receive power source from a common external power source 15 (DC power source), and supply power sources to the light emitting sensor head 1 and the light receiving sensor head 2, respectively.

The branch connector 102 branches a communication line and a power source line between the light emitting sensor head 1 and the light receiving sensor head 2. The branched communication lines and the power source lines are compacted in the dedicated cord 3. The communication unit 4 is connected to the dedicated cord. The communication unit 4 is connected to the personal computer 5 (PC in FIG. 2).

The communication unit 4 comprises a microcomputer 36 (Microcomputer in FIG. 2), a communication circuit 37, a power source circuit 38, and a communication converter 34. The communication circuit 37 is an interface in conformity with RS485. The power source circuit 38 takes in a power source from the external power source 15 through the branch connector 102 and supplies it to each part of the communication unit 4. The communication converter 34 converts a signal in conformity with RS485 serially and outputs it as a signal in conformity with RS232C, USB (Universal Serial Bus) and the like.

The process circuit 26 sets the plurality of light emitting elements 11 so as not to emit light through the process circuit 16 and receives a signal S1 corresponding to received ambient light from each light receiving element 21. The process circuit 26 generates light receiving information (data DT) showing the light receiving state of the ambient light with respect to each predetermined number of light receiving elements among the plurality of light receiving elements 21. The communication circuit 27 transmits the data DT to the outside. The communication unit 4 transmits the data DT from the communication circuit 27 to the personal computer 5. The personal computer 5 displays the data DT from the communication unit 4. With the conventional photoelectric sensor, the operator can only grasp whether ambient light is inputted or not. With the sensor SNS, a light receiving amount at each optical axis, for example can be displayed on the personal computer 5. Thus, the operator can find the light receiving state of the ambient light more precisely than the conventional sensor.

When the operator recognizes that the ambient light inputted to a specific optical axis is intense, the operator can specify the incident direction of the ambient light and the like roughly. Thus, a time required for specifying the cause for the generation of the ambient light becomes short as compared with the conventional sensor.

In addition, as a display unit to display the data DT, a dedicated console may be connected to the communication unit 4 instead of the personal computer 5 shown in FIG. 2.

Figure 3:
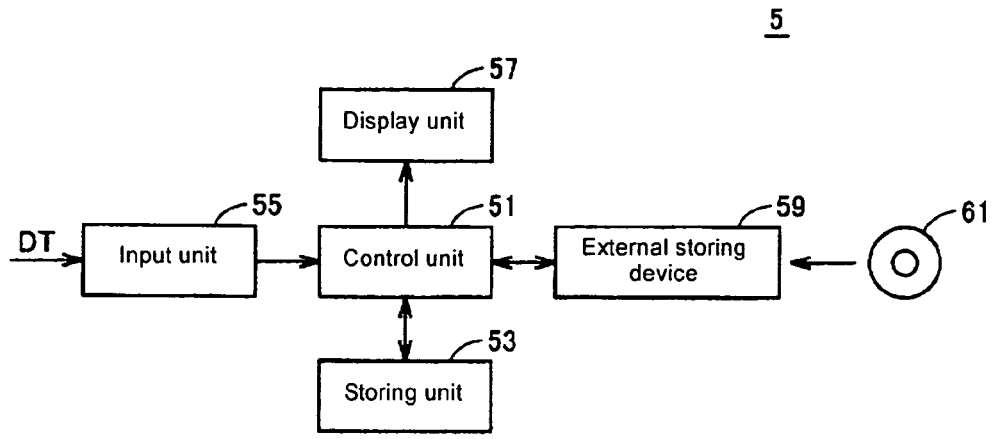
FIG. 3 is a view showing the constitution of a personal computer 5 in FIG. 2.

FIG. 3 is a view showing the constitution of the personal computer 5 shown in FIG. 2. Referring to FIG. 3, the personal computer 5 comprises a control unit 51 for controlling the whole operation, an input unit 55 for inputting data, a storing unit 53 for storing the data temporally, a display unit 57 for outputting the data, and an external storing device 59 for storing a program and the like to be executed by the control unit 51 in a nonvolatile manner.

The control unit 51 comprises a CPU, and a read only memory (ROM) for storing a program executed by the CPU and a random access memory (RAM) for storing variables and the like that are required when the program is executed by the CPU.

The input unit 55 is a key board or a mouse through which characters or numerals are inputted or a predetermined command is inputted. In addition, the input unit 55 receives the data DT from the communication unit 4.

The storing unit 53 temporally stores various kinds of data required for setting the sensor SNS. The display unit 57 is a display such as a liquid crystal display and the like and displays the information showing the light receiving state of the ambient light according to the command of the control unit 51.

The external storing device 59 reads the program and data stored in a recording medium 61 that can be read by the computer and transmits it to the control unit 51. The recording medium 61 that can be read by the computer includes a tape such as a magnetic tape and a cassette tape, a disk such as a magnetic disk (a flexible disk and a hard disk) and an optical disk (CD-ROM/MO/MD/DVD), a card such as an IC card (including a memory card) and an optical card, or a semiconductor memory such as a mask ROM, an EPROM, and a flash memory, in which the program is fixedly recorded. In addition, the program may be downloaded from the network (not shown). When the program recorded in the recording medium 61 is read by the external storing unit 59, the control unit 51 can execute that program.

Furthermore, although the data DT is outputted through the screen of the display unit 57 according to this embodiment, the data DT may be outputted to the external storing device 59 or the recording medium 61 or printed out by a printing device.

Figure 4:
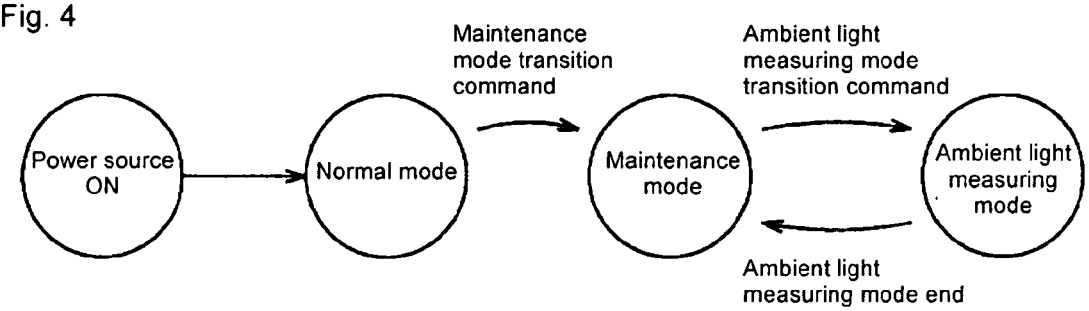
FIG. 4 is a view schematically showing operation modes set in the sensor SNS and the relation between them.

FIG. 4 is a view schematically showing operation modes set in the sensor SNS and the relation between them.

Referring to FIG. 4, there are three modes, that is, a normal mode, a maintenance mode and an ambient light measuring mode in the sensor SNS. The normal mode is a mode for detecting an object normally. In the maintenance mode, although the sensor SNS emits and receives light, its detected result is not outputted. The ambient light measuring mode is for measuring ambient light inputted to the optical axis of the sensor SNS.

Although the sensor SNS is set in the normal mode just after the power source is turned on, when a transition command to the maintenance mode is applied from the personal computer 5, the mode is switched to the maintenance mode. When a transition command to the ambient light measuring mode is applied from the personal computer 5 in the maintenance mode, the mode is switched to the ambient light measuring mode. When a command to stop the ambient light measuring mode is applied from the personal computer 5 in the ambient light measuring mode, the sensor SNS finishes the ambient light measuring mode and switches the mode to the maintenance mode. In addition, when the power source is turned on again in the maintenance mode again, the operation mode returns to the normal mode.

Figure 5:
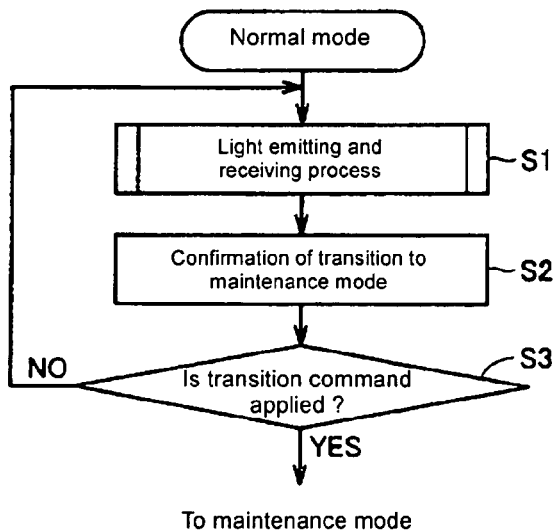
FIG. 5 is a flowchart to explain a process in a normal mode in FIG. 4.

FIG. 5 shows a flowchart to explain the process in the normal mode shown in FIG. 4. Referring to FIG. 5, when the process is started, the light emitting and receiving process is performed between the light emitting sensor head 1 and the light receiving sensor head 2 at step S1.

During the light emitting and receiving process, the process circuit 16 shown in FIG. 2 generates a timing signal every predetermined time to generate signal light and applies it to the optical axis sequential selection circuit 13. The optical axis sequential selection circuit 13 sequentially connects the drive circuit 12 corresponding to each light emitting element 11 to the process circuit 16. Thus, the timing signal from the process circuit 16 is sequentially applied to each drive circuit 12 and light of the light emitting element 11 is sequentially emitted. The timing signal is also applied to the process circuit 26 on the side of the light receiving sensor head 2 through the communication circuits 17 and 27.

In the light receiving sensor head 2, an output (signal S2 in FIG. 2) from each light receiving element 21 is transmitted to the process circuit 26 through the amplifier 22 and the switch 23. The process circuit 26 transmits the timing signal from the light emitting sensor head 1 to the optical axis sequential selection circuit 25, sequentially turns on the switch 23 of each optical axis, takes in the output from the light receiving element 21 corresponding to the light emitting element 11 that emitted the signal light, compares each output with a predetermined threshold value and determines whether each optical axis is in a light shielding state or not. When all outputs of the optical axes are completed, the process circuit 26 collects the determined results of all of the optical axes to perform a final determining process, generates an object detection signal showing the determined result, and outputs it to the outside through an output circuit (not shown).

Then, at step S2, the process circuit 26 of the light receiving sensor head 2 confirms whether the transition command to the maintenance mode is applied from the control unit 51 shown in FIG. 4 or not. In addition, when the control unit 51 detects that the communication unit 4 is connected to the sensor SNS, it transmits the transition command to the sensor SNS.

Then, at step S3, when the transition command is applied (YES at step S3), the process circuit 26 switches the operation mode to the maintenance mode. When the transition command is not applied (NO at step S3), the process circuit 26 performs light emitting and receiving process at step S1 again.

Figure 6:
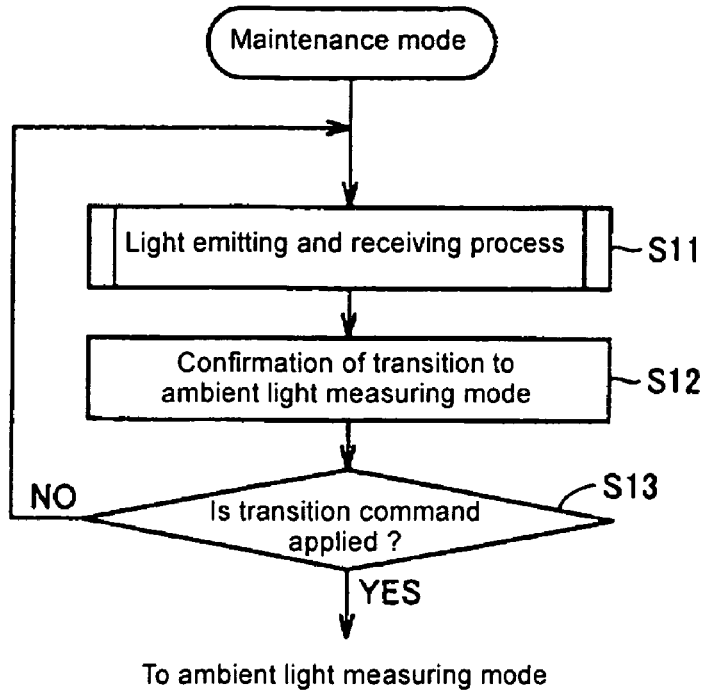
FIG. 6 is a flowchart to explain a process in a maintenance mode in FIG. 4.

FIG. 6 shows a flowchart to explain the process in the maintenance mode in FIG. 4. Referring to FIG. 6, when the process is started, a light emitting and receiving process is performed at step S11. However, the object detection signal is not outputted in this light emitting and receiving process. Then, at step S12, the process circuit 26 confirms whether the transmission command to the ambient light measuring mode is applied from the control unit 51 or not. This transition command is applied from the control unit 51 to the sensor SNS in response to the start of a measuring software.

At step S13, when the transition command is applied (YES at step S13), the process circuit 26 switches the operation mode to the ambient light measuring mode. When the transition command is not applied (NO at step S13), the process circuit 26 performs the light emitting and receiving process at step S11 again.

Figure 7:
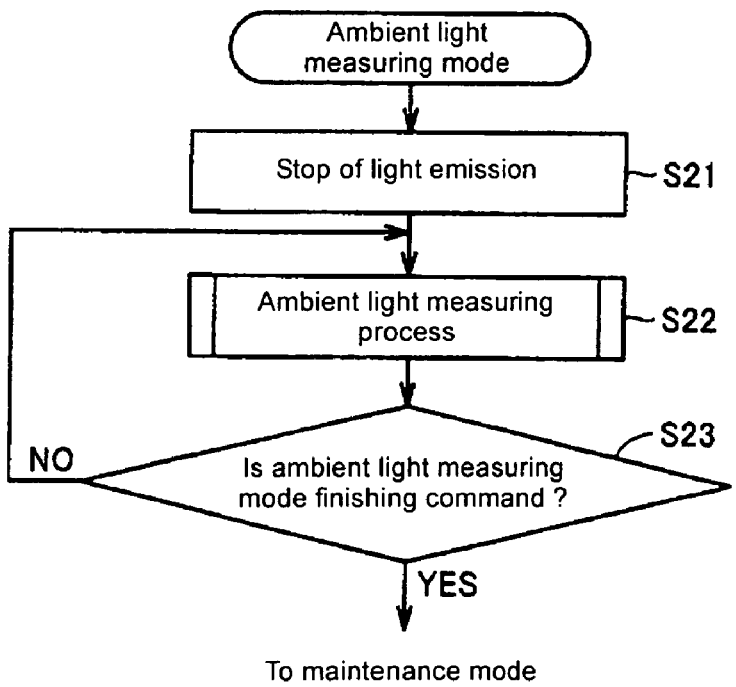
FIG. 7 is a flowchart to explain a process in an ambient light measuring mode in FIG. 4.

FIG. 7 shows a flowchart to explain the process in the ambient light measuring mode. Referring to FIG. 7, at step S21, the process circuit 26 stops the light emitting and receiving process. Then, at step S22, the process circuit 26 performs an ambient light measuring process as will be described below. At step S23, the process circuit 26 determines whether a command for finishing the ambient light measuring mode is applied from the control unit 51 or not. When the ambient light measuring mode finishing command is transmitted (YES at step S23), the process circuit 26 switches the operation mode to the maintenance mode. Meanwhile, when the ambient light measuring mode finishing command is not sent (NO at step S23), the process returns to the step S22.

Figure 8:
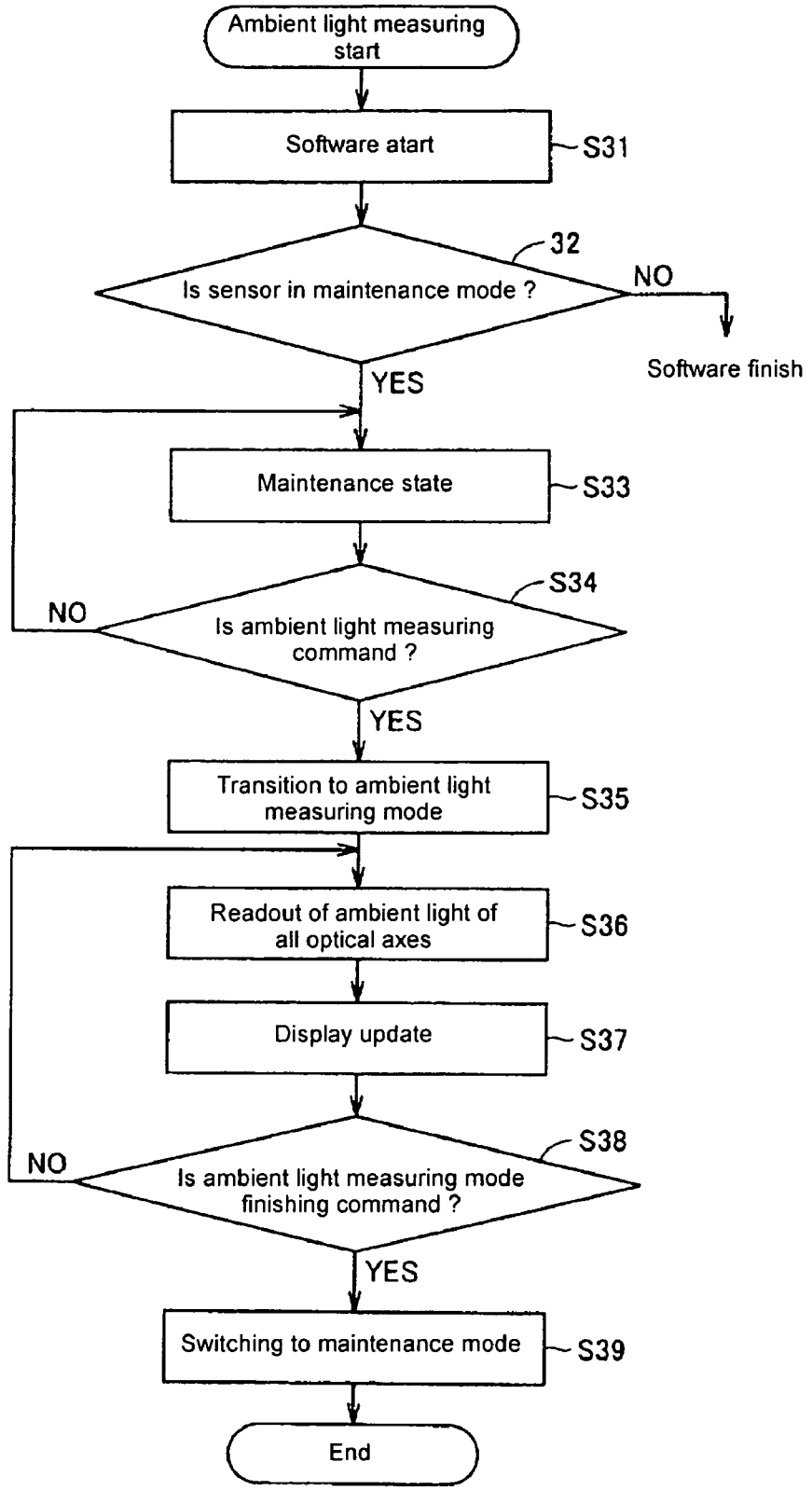
FIG. 8 is a flowchart to explain the process in the ambient light measuring mode in detail.

FIG. 8 shows a flowchart to explain the process in the ambient light measuring mode in detail. Referring to FIG. 8, at step S31, the process is started when the measuring software is started in the control unit 51.

Then, at step S32, it is determined whether the sensor SNS is in the maintenance mode or not. When the operation mode of the sensor SNS is the maintenance mode (YES at step S32), the process proceeds to step S33. When the operation mode of the sensor SNS is not the maintenance mode (NO at step S32), the measuring software is completed.

At step S33, the sensor SNS is transited to the maintenance state. At step S34, the process circuit 26 determines whether the ambient light amount measuring command is transmitted from the personal computer 5 or not. When the ambient light amount measuring command is transmitted (YES at step S34), the process proceeds to step S35. When the ambient light amount measuring command is not transmitted (NO at step S34), the process returns to the step S33.

At step S35, the process circuit 26 switches the operation mode to the ambient light measuring mode. Then, at step S36, the process circuit 26 obtains the amount of the ambient light of all of the optical axes. Although this process is the same as the above light emitting and receiving process, this process is different in that the light emitting element 11 is set in the state in which the light is not emitted. The process circuit 26 generates data DT according to the signal S1 or the signals S1 and S2. The data DT is sent to the personal computer 5 through the communication unit 4.

At step S37, the control unit 5 updates the display on the display unit 57 based on the acquired data DT. At step S38, the process circuit 26 determines whether the ambient light measuring mode finishing command is sent from the personal computer 5 or not. When the ambient light measuring mode finishing command is sent (YES at step S38), the process circuit 26 switches the operation mode to the maintenance mode at step S39. When the operation mode is switched to the maintenance mode, the whole process is completed. Meanwhile, when the ambient light measuring mode finishing command is not sent at step S38 (NO at step S38), the process returns to the step S36.

Next, a description will be made of an example of the data DT displayed on the display unit 57 (display screen) in the display updating process at the step S37.

(Screen Display Example)

Figure 9:
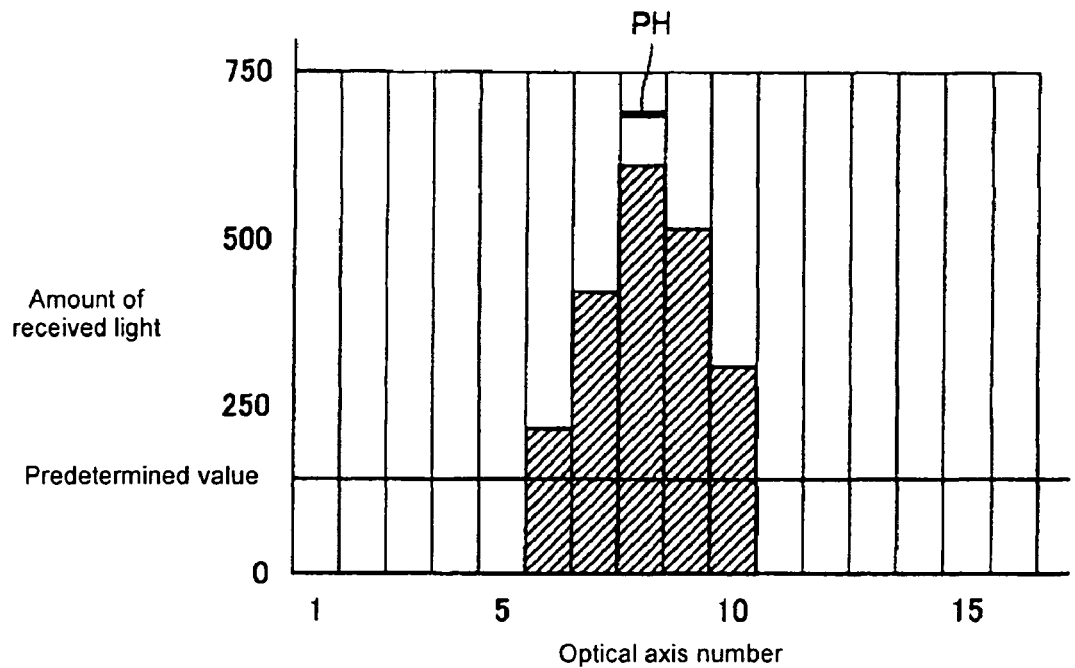
FIG. 9 is a view showing one example of a screen display.

FIG. 9 is a view showing one example of the screen display. Referring to FIG. 9, the lateral axis of a graph designates an optical axis number allotted to each of the plurality of light receiving elements 21, and a vertical axis designates the amount of received ambient light corresponding to the optical axis number. The operator can find the optical axis having the greatest amount of inputted ambient light with reference to the graph in FIG. 9.

In addition, a bar PH designates a past maximum value of the received light amount at a certain optical number. The operator can know the maximum value of the received light amount for a certain period without monitoring the screen all the time. When the amount of the light received exceeds the past maximum value, the bar PH is updated so as to show that light amount. In addition, although only one bar PH is shown in FIG. 9, it can be displayed in each optical axis at the same time.

Moreover, a determination value (a "predetermined value" in FIG. 9) to determine the received light level of the ambient light is also displayed in the graph. The predetermined value designates the amount of the ambient light under which the sensor can operate correctly when the light of the light emitting element is shielded. That is, the predetermined value shows the amount of the ambient light that is allowable as a noise. In addition, this predetermined value may be appropriately changed by the user.

Figure 10:
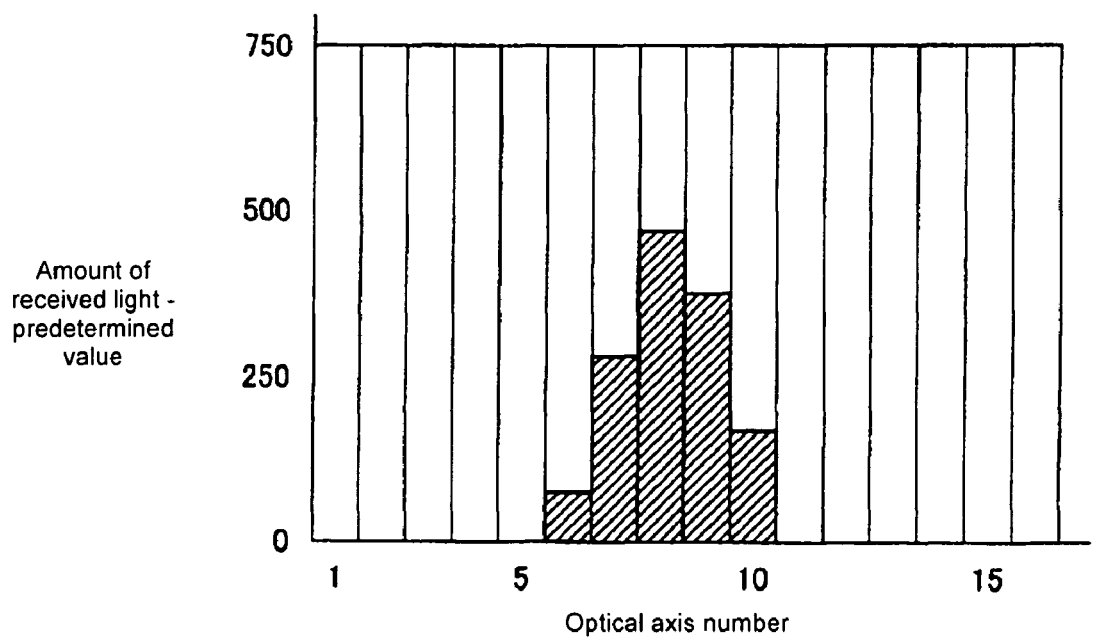
FIG. 10 is a view showing another example of the screen display.

FIG. 10 is a view showing another example of the screen display. Referring to FIG. 10, the difference between the amount of the ambient light and the predetermined vale is displayed corresponding to the optical axis number as light receiving information. In FIG. 10, the ambient light amount itself is not shown. However, the operator can easily find the optical axis having the amount of the ambient light that exceeds the predetermined value with reference to the graph in FIG. 10.

Figure 11:
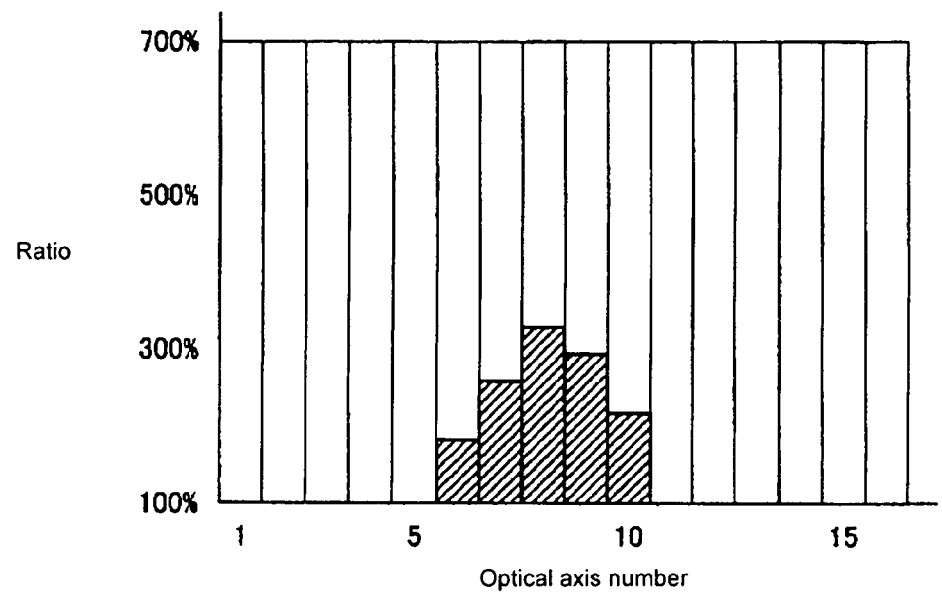
FIG. 11 is a view showing still another example of the screen display.

FIG. 11 is a view showing still another example of the screen display. Referring to FIG. 11, a ratio between the amount of the ambient light and the predetermined value (ambient light amount/predetermined value) is displayed so as to correspond to the optical axis number as light receiving information. Similar to FIG. 10, the operator can easily find the optical axis having the amount of the ambient light that exceeds the predetermined value.

Figure 12:
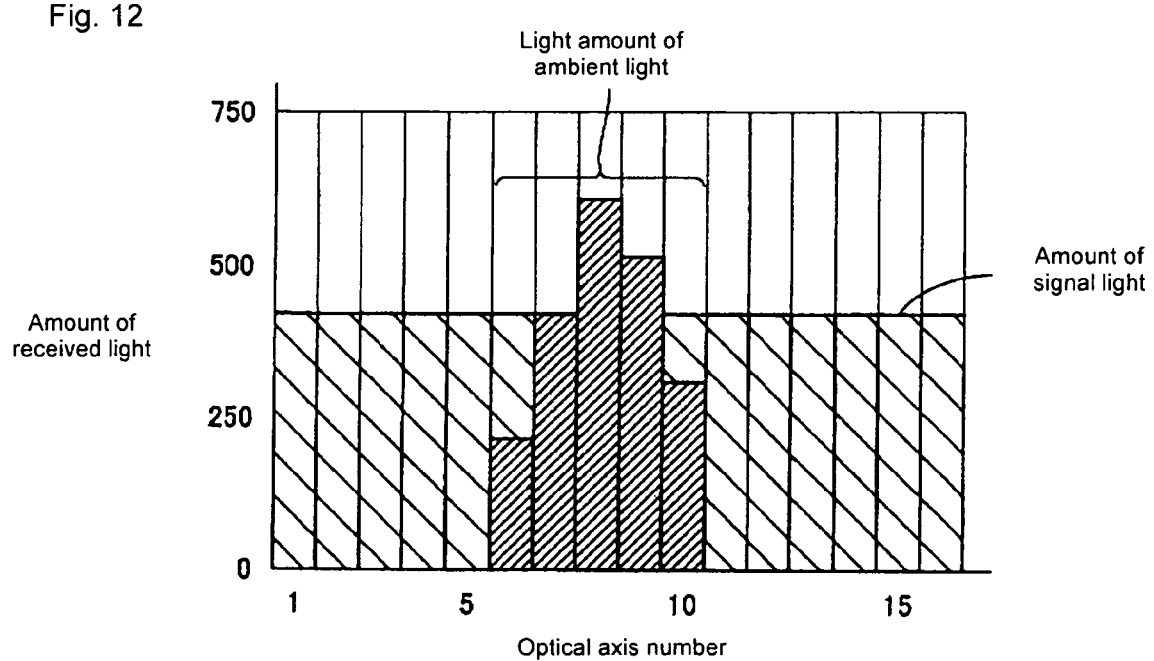
FIG. 12 is a view showing still another example of the screen display.

FIG. 12 is a view showing still another example of the screen display. Referring to FIG. 12, the amount of the signal light and the amount of the ambient light are displayed so as to correspond to the optical axis number. The operator can find the optical axis having ambient light stronger than the signal light with reference to the graph in FIG. 12. In addition, the amount of the signal light is measured by the process circuit 26 just before the process to stop the light emitting and receiving operations at step S21 in FIG. 7, for example.

Figure 13:
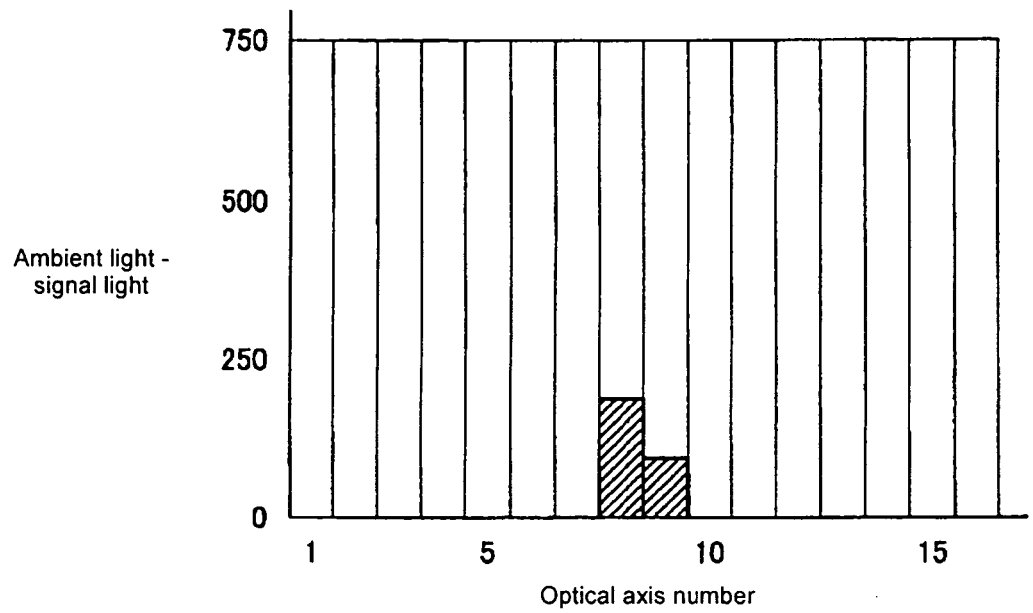
FIG. 13 is a view showing still another example of the screen display.

FIG. 13 is a view showing still another example of the screen display. Referring to FIG. 13, the difference between the amount of the ambient light and the amount of the signal light (the signal light is subtracted from the ambient light) is displayed corresponding to the optical axis number as light receiving information. The operator can easily find the optical axis having ambient light stronger than the signal light with reference to the graph in FIG. 13.

Figure 14:
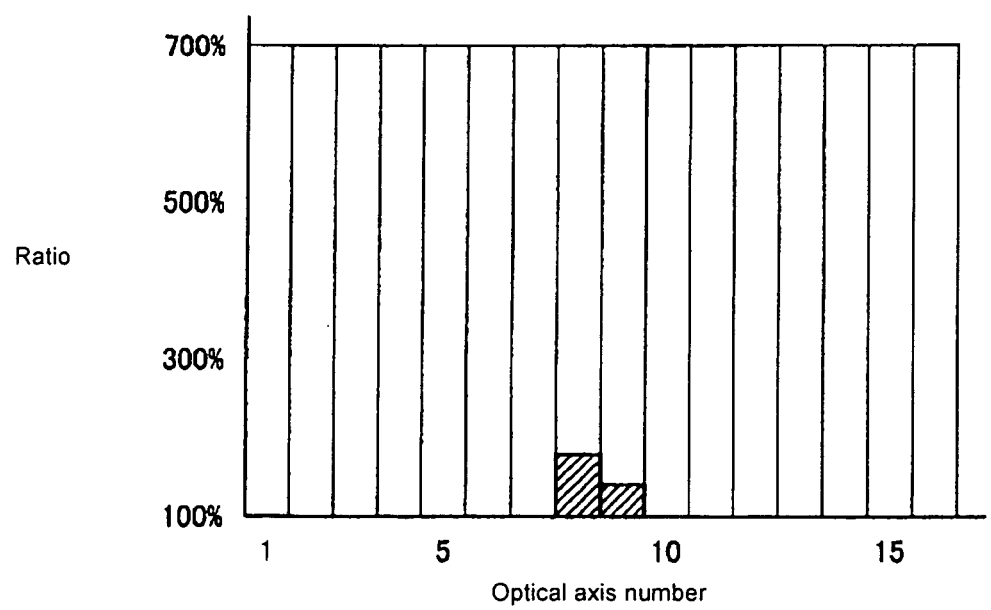
FIG. 14 is a view showing still another example of the screen display.

FIG. 14 is a view showing still another example of the screen display. Referring to FIG. 14, a ratio between the amount of the ambient light and the amount of the signal light (ambient light amount/signal light amount) is displayed so as to correspond to the optical axis number as light receiving information. Similar to FIG. 13, the operator can easily specify the optical axis having ambient light stronger than the signal light.

FIG. 15 is a view showing still another example of the screen display. Referring to FIG. 15, the amount of the ambient light is displayed such that it reaches one of stages (level 0 to level 3) as light receiving information. Since the intensity of the ambient light is shown by one of four stages, the operator can roughly specify the optical axis having strong ambient light with reference to FIG. 15. In addition, the level of the light receiving information may be displayed in the graphs shown in FIGS. 10 to 14.

FIG. 16 is a view showing still another example of the screen display. Referring to FIG. 16, there are displayed a "light receiving number" showing the number of each optical axis, a "sensor length" showing the distance from one end of the light receiving sensor head 2 to each light receiving element, a "light receiving level" showing the amount of light received in each light receiving number, and a bar graph corresponding to the received light amount. Thus, since the sensor length and the light receiving information are displayed so as to be related to each other, when there are many optical axes (100, for example), the operator can easily find the position in which the ambient light is inputted to the light receiving sensor head 2.

As described above, FIGS. 9 to 16 show examples in which the light receiving information of each light receiving element is displayed. That is, FIGS. 9 to 16 show the examples in which when the light receiving information is displayed with respect to each predetermined number of light receiving elements among the plurality of light receiving elements, the predetermined number is set to one. However, the predetermined number may be two or more.

Figure 17:
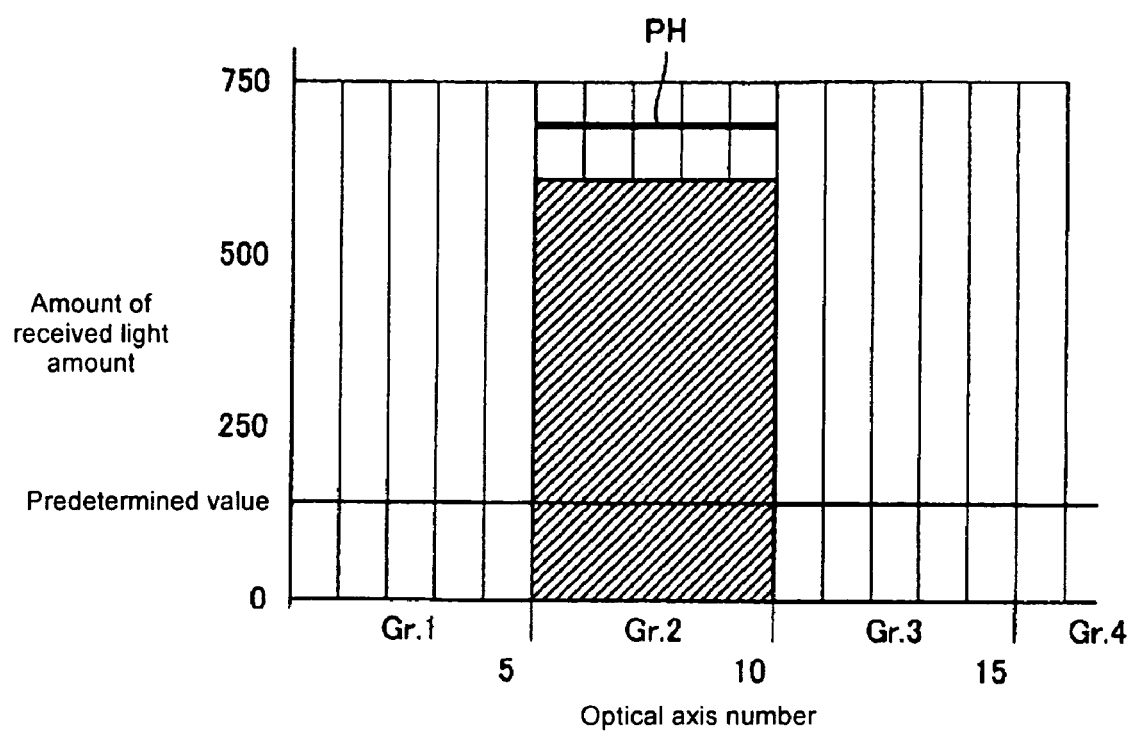
FIG. 17 is a view showing still another example of the screen display.

FIG. 17 is a view showing still another example of the screen display. Referring to FIG. 17, groups Gr. 1 to Gr. 4 shown along the lateral axis of the graph designate identifiers (group number) sequentially allotted to groups comprising five light receiving elements, for example. The vertical axis of the graph shows the total amount of the ambient light received by the light receiving elements belonging to each group. In addition, a bar PH in FIG. 17 shows the maximum value of the total light amount of a certain group (group Gr. 2 in FIG. 17).

The operator can roughly know the position in which strong ambient light is inputted with reference to the graph shown in FIG. 17. In addition, similar to FIG. 15, the level of the light receiving information may be displayed.

Furthermore, the graphs shown in FIGS. 9 to 17 may be sequentially or collectively displayed on the screen of the personal computer 5 shown in FIG. 1.

As described above, according to the embodiment 1, the operator can find the light receiving element (or the range of the light receiving elements) in which the ambient light is inputted, in the multi-optical axis photoelectric sensor. Thus, since the user can find which optical axis is affected by the ambient light, the measures against the ambient light can be taken quantitatively.

Embodiment 2

According to an embodiment 2, a display device is incorporated in a multi-optical axis photoelectric sensor.

Figure 18:
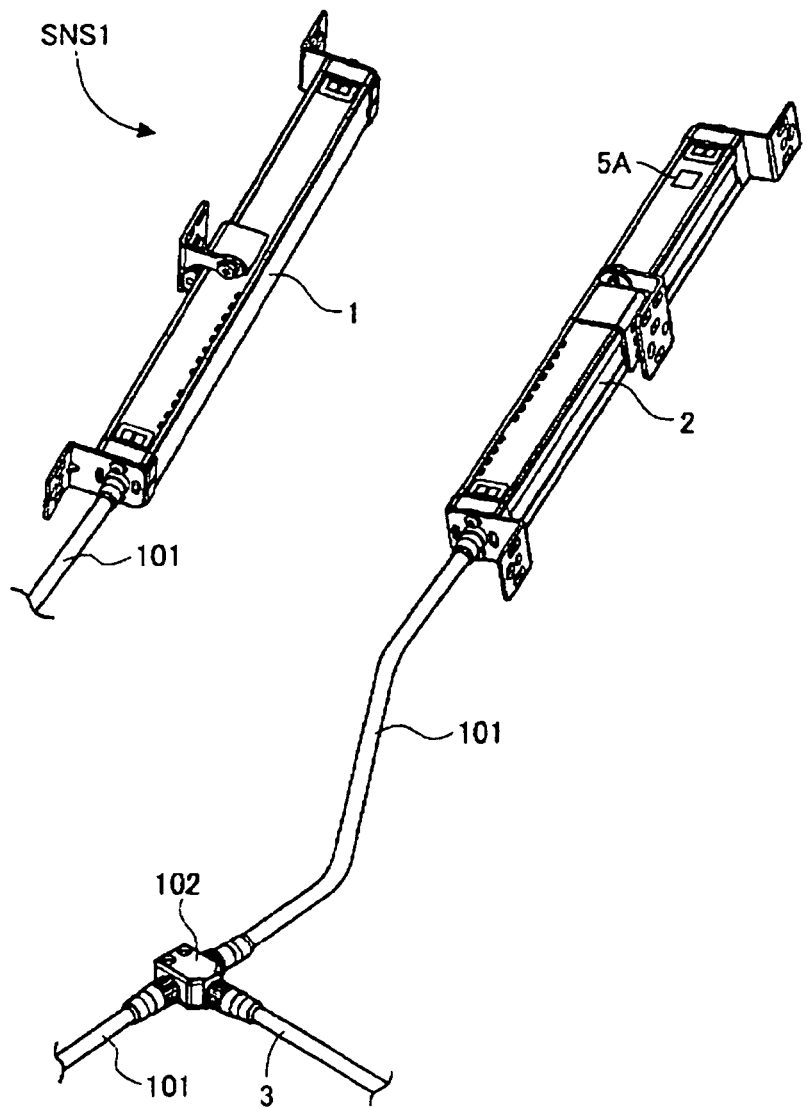
FIG. 18 is a view showing the constitution of a sensor device according to an embodiment 2.

FIG. 18 is a view showing the constitution of a sensor device according to the embodiment 2.

Referring to FIG. 18, a sensor SNS 1 is different from the sensor SNS in that it further comprises a display device 5A, and it does not comprise the dedicated cord 3, the communication unit 4 and the personal computer 5. Since other parts of the sensor SNS 1 are the same as those in the sensor SNS, the explanation thereof is not repeated. In addition, although the display device 5A is provided in a light receiving sensor head 2 in FIG. 18, it may be provided in a light emitting sensor head 1 or may be provided in both of them.

Figure 19:
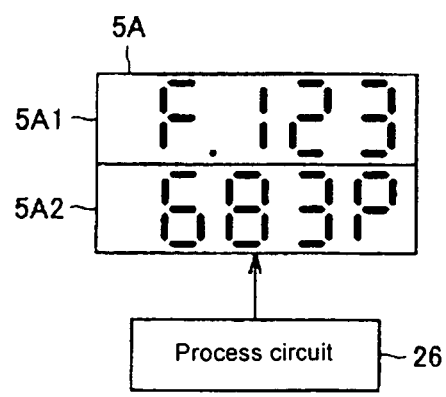
FIG. 19 is a view showing a display example of a display device 5A in FIG. 18.

FIG. 19 is a view showing a display example in the display device 5A in FIG. 18. Referring to FIG. 19, the display device 5A displays data in accordance with the command of a process circuit 26. In addition, the display device 5A obtains data DT from a process circuit 27. The display device 5A comprises a display window 5A1 emitting light and displaying an optical axis number (123 in the example in FIG. 19), and a display window 5A2 emitting light and displaying light receiving information as a numeric value.

In addition, the display window 5A1 may display the above sensor length or the group number. In addition, in the example shown in FIG. 19, the display window 5A2 displays that the ratio (ambient light/predetermined value) is 683%. However, the present invention is not limited to this and the display window 5A2 can display the value of the vertical axis of each graph in FIGS. 9 to 17 as light receiving information.

According to this embodiment 2, the operator can easily know the light receiving state of the ambient light in the sensor without externally providing the personal computer. Thus, the embodiment 2 becomes more convenient for the user.

Embodiment 3

Although an embodiment 3 is similar to the embodiment 2 in that a display device is incorporated in a multi-optical axis photoelectric sensor, it is different from the embodiment 2 in display configuration.

Figure 20:
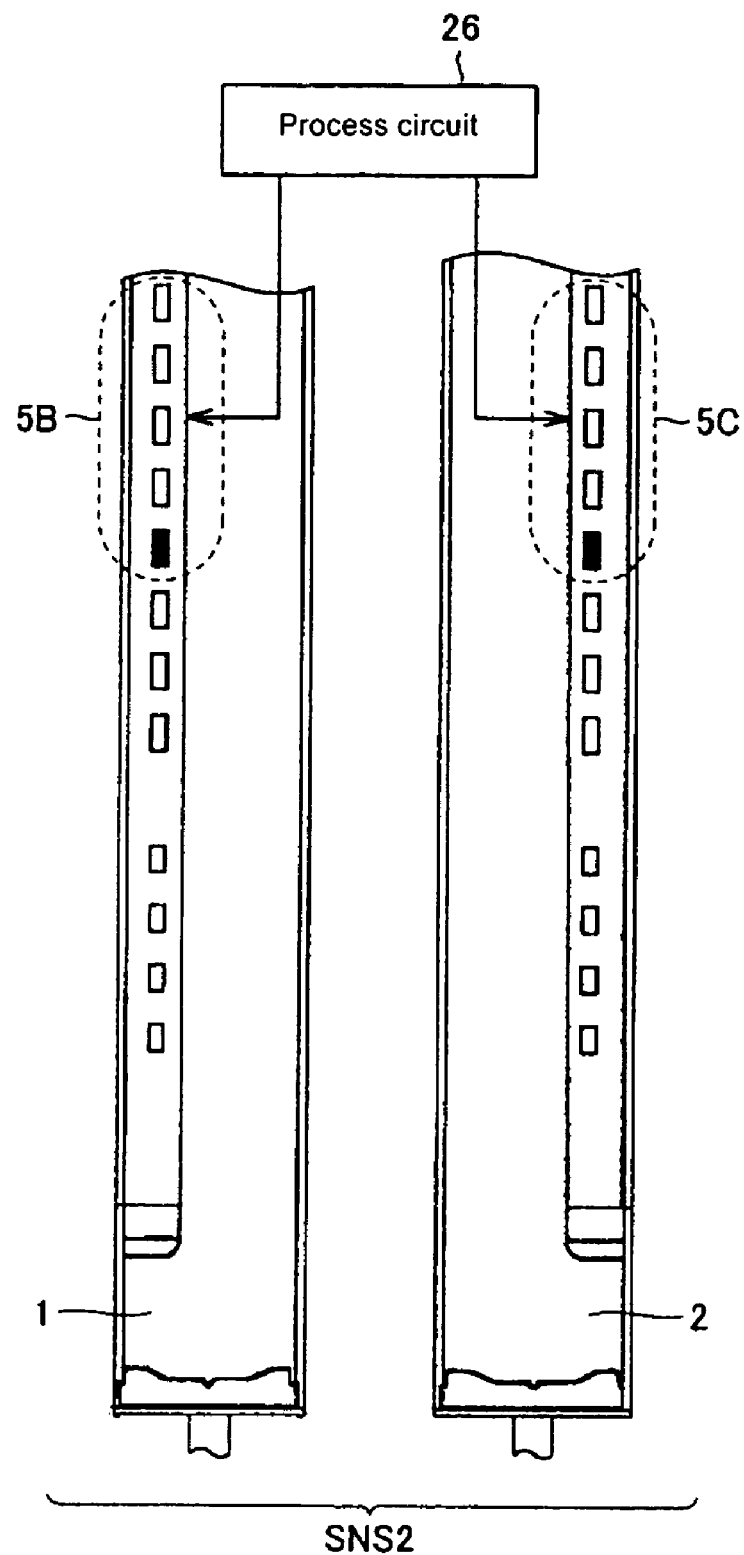
FIG. 20 is a view showing the constitution of a sensor device according to an embodiment 3.

FIG. 20 is a view showing the constitution of a sensor device according to the embodiment 3.

Referring to FIG. 20, a sensor SNS 2 is different from the sensor SNS 1 in FIG. 18 in that light emitting display units 5B and 5C are provided in a light emitting sensor head 1 and a light receiving sensor head 2, respectively. Since other constitution is the same as that of the sensor SNS 1, the explanation for it is not repeated. In addition, the light emitting display unit may be provided in either the light emitting sensor head 1 or the light receiving sensor head 2.

Each of the light emitting display units 5B and 5C comprises LED's (Light Emitting Diodes) as many as the groups comprising the predetermined number (five, for example) of light receiving elements. For example, when the amount of the ambient light in a certain group exceeds a predetermined value, the LED corresponding to that group emits light in accordance with the light emitting information received from a process circuit 26 through a communication circuit 27. Thus, since the operator can find that strong ambient light is inputted only to a certain range of the light receiving sensor head 2, the operator can easily specify the cause for generation of the ambient light. In addition, the reference to determine whether the LED is to be emitted such that when the ambient light is stronger than the signal light, the process circuit 26 flashes the LED, for example may be appropriately changed in the process circuit 26.

Furthermore, the number of the LED elements can be reduced by providing the LED's as many as the groups, each of the light emitting display units 5B and 5C may comprise the LED's as many as the optical axes.

According to the embodiment 3 as described above, similar to the embodiment 2, the operator can easily find the light receiving state of the ambient light in the sensor without externally providing the personal computer. Thus, the embodiment 3 becomes more convenient for the user.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multi-optical axis photoelectric sensor device comprising:
   a light emitting part having a plurality of light emitting elements;
   a light receiving part having a plurality of light receiving elements, each of the plurality of light receiving elements corresponding to a respective light emitting element of the plurality of light emitting elements, each light receiving element and its corresponding light emitting element comprising an optical axis, the plurality of light emitting elements arranged in a first row and the plurality of light receiving elements arranged in a second row such that the optical axes are parallel to each other;
   a process part,
      in a normal mode, sequentially causing each light emitting element to emit light, receiving a received light signal corresponding to received light from each of the plurality of light receiving elements at a timing synchronized with the light emitting operation of a respective of the light emitting elements, and determining whether or not each optical axis is in a light shielding state or not depending on the received light signal; and
      in an ambient light measuring mode, setting the plurality of light emitting elements to a state in which the light is not emitted, receiving a first signal corresponding to received ambient light sequentially from each of the plurality of light receiving elements, and generating light receiving information showing the light receiving state of the ambient light with respect to each predetermined number of light receiving elements among the plurality of light receiving elements based on the first signal so as to identify each optical axis where ambient light is incident among the plurality of optical axes; and
   an output part outputting the light receiving information to the outside.

2. The sensor device according to claim 1, wherein the output part is a transmission part for transmitting the light receiving information to the outside.

3. The sensor device according to claim 2, further comprising a display device for displaying the light receiving information from the transmission part.

4. The sensor device according to claim 3, wherein the display device displays the received amount of the ambient light as the light receiving information.

5. The sensor device according to claim 4, wherein the display device displays a past maximum value of the received amount of the ambient light as the light receiving information and, when the received amount of the ambient light exceeds the past maximum value, updates the past maximum value to the present received amount of the ambient light for display.

6. The sensor device according to claim 4, further comprising a storing part storing a determination value for determining the light receiving level of the ambient light, wherein the display device further displays the determination value as the light receiving information.

7. The sensor device according to claim 3, wherein the display device displays the difference between the received amount of the ambient light and a determination value for determining the light receiving level of the ambient light as the light receiving information.

8. The sensor device according to claim 3, wherein the display device displays the ratio between the received amount of the ambient light and a determination value for determining the light receiving level of the ambient light as the light receiving information.

9. The sensor device according to claim 3, wherein the process part further sets the plurality of light emitting elements to a state in which the light is emitted, receives a second signal corresponding to a received signal light from each of the plurality of light receiving elements, and generates the light receiving information based on the first and second signals.

10. The sensor device according to claim 9, wherein the display device displays the received amount of the ambient light and the received amount of the signal light as the light receiving information.

11. The sensor device according to claim 9, wherein the display device displays the difference between the received amount of the ambient light and the received amount of the signal light as the light receiving information.

12. The sensor device according to claim 9, wherein the display device displays the ratio between the amount of the ambient light and the amount of the signal light as the light receiving information.

13. The sensor device according to claim 3, wherein the display device displays that the received amount of the ambient light reaches one of stages as the light receiving information.

14. The sensor device according to claim 1, wherein the output part comprises a display device disposed as part of at least one of the light receiving part or the light emitting part, the display device configured to display the light receiving information.

15. The sensor device according to claim 14, wherein the display device is a light emitting device emitting light and displaying the position of the light receiving element whose received amount of the ambient light exceeds a predetermined value among the plurality of light receiving elements as the light receiving information.

16. The sensor device according to claim 1, wherein the predetermined number is one.

17. The sensor device according to claim 16, the display device displays the light receiving information so as to relate a distance from one end of the light receiving part to each of the plurality of light receiving elements, to the light receiving information.

18. The sensor device according to claim 1, wherein the predetermined number is two or more.

* * * * *